(12) United States Patent
Koseoglu et al.

(10) Patent No.: US 11,613,714 B2
(45) Date of Patent: Mar. 28, 2023

(54) CONVERSION OF AROMATIC COMPLEX BOTTOMS TO USEFUL PRODUCTS IN AN INTEGRATED REFINERY PROCESS

(71) Applicant: Saudi Arabian Oil Company, Dhahran (SA)

(72) Inventors: Omer Refa Koseoglu, Dhahran (SA); Robert Peter Hodgkins, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 74 days.

(21) Appl. No.: 17/147,784

(22) Filed: Jan. 13, 2021

(65) Prior Publication Data

US 2022/0220397 A1 Jul. 14, 2022

(51) Int. Cl.

| | | |
|---|---|---|
| *C10G 69/10* | (2006.01) |
| *B01D 3/14* | (2006.01) |
| *B01J 8/24* | (2006.01) |
| *B01D 15/42* | (2006.01) |
| *B01J 8/18* | (2006.01) |
| *B01J 19/24* | (2006.01) |
| *C10B 27/00* | (2006.01) |
| *C10B 39/04* | (2006.01) |

(52) U.S. Cl.
CPC ............ *C10G 69/10* (2013.01); *B01D 3/14* (2013.01); *B01D 15/424* (2013.01); *B01J 8/1827* (2013.01); *B01J 8/24* (2013.01); *B01J 19/245* (2013.01); *C10B 27/00* (2013.01); *C10B 39/04* (2013.01); *B01J 2219/0004* (2013.01); *C10G 2300/1044* (2013.01); *C10G 2300/301* (2013.01); *C10G 2300/308* (2013.01); *C10G 2400/02* (2013.01); *C10G 2400/30* (2013.01)

(58) Field of Classification Search
None
See application file for complete search history.

(56) References Cited

U.S. PATENT DOCUMENTS

| | | |
|---|---|---|
| 2,697,684 A | 12/1954 | Hemminger et al. |
| 2,836,632 A | 5/1958 | Fetterly |
| 2,881,226 A | 4/1959 | Wadsworth |
| 2,885,452 A | 5/1959 | Schmerling |
| 2,954,413 A | 9/1960 | Kroeper |
| 3,053,760 A | 9/1962 | Henke et al. |

(Continued)

OTHER PUBLICATIONS

Notification of Transmittal of the International Search Report and the Written Opinion of the International Searching Authority, or the Declaration dated Apr. 29, 2022 pertaining to International application No. PCT/US2022/012104 filed Jan. 12, 2022, pp. 1-12.

*Primary Examiner* — Tam M Nguyen
(74) *Attorney, Agent, or Firm* — Dinsmore & Shohl LLP

(57) ABSTRACT

Systems and integrated methods are disclosed for processing aromatic complex bottoms into high value products. The system includes an adsorption column, the adsorption column in fluid communication with an aromatics complex and operable to receive and remove polyaromatics from an aromatic bottoms stream. The adsorption column producing a cleaned aromatic bottoms stream with reduced polyaromatic content and a reject stream including the removed polyaromatics. In some embodiments, the reject stream is recycled for further processing, passed to a coke production unit to produce high quality coke, or both.

16 Claims, 9 Drawing Sheets

(56) References Cited

U.S. PATENT DOCUMENTS

| | | |
|---|---|---|
| 3,062,903 A | 11/1962 | Odioso et al. |
| 3,067,128 A | 12/1962 | Kimberlin, Jr. et al. |
| 3,075,022 A | 1/1963 | Gammon et al. |
| 3,116,345 A | 12/1963 | Slaymaker |
| 3,145,238 A | 8/1964 | Kestner |
| 3,159,565 A | 12/1964 | Kimberlin, Jr. et al. |
| 3,204,007 A | 8/1965 | Mukai et al. |
| 3,252,888 A | 5/1966 | Langer, Jr. et al. |
| 3,373,217 A | 3/1968 | Engelbrecht et al. |
| 3,441,625 A | 4/1969 | Bargeron et al. |
| 3,485,883 A | 12/1969 | Engelbrecht et al. |
| 3,557,234 A | 1/1971 | Henry et al. |
| 3,557,235 A | 1/1971 | Henry et al. |
| 3,595,933 A | 7/1971 | Feldman et al. |
| 3,624,172 A | 11/1971 | Adams |
| 3,639,221 A | 2/1972 | Dorsey, Jr. |
| 3,649,520 A | 3/1972 | Graven |
| 3,702,292 A | 11/1972 | Bunch |
| 3,723,256 A | 3/1973 | Thompson |
| 3,795,608 A | 3/1974 | Fujiyama et al. |
| 3,933,619 A | 1/1976 | Kozlowski |
| 3,957,621 A | 5/1976 | Bonacci et al. |
| 4,031,154 A | 6/1977 | Edison et al. |
| 4,070,408 A | 1/1978 | Vickers |
| 4,192,961 A | 3/1980 | Polyakov et al. |
| 4,203,826 A | 5/1980 | Mayes |
| 4,222,854 A | 9/1980 | Vorhis, Jr. et al. |
| 4,242,531 A | 12/1980 | Carter |
| 4,244,808 A | 1/1981 | Lang et al. |
| 4,324,935 A | 4/1982 | Wernicke et al. |
| 4,532,370 A | 7/1985 | Le Quan et al. |
| 4,538,018 A | 8/1985 | Carter |
| 4,747,933 A | 5/1988 | Hibbs |
| 4,806,700 A | 2/1989 | Martindale |
| 4,923,589 A | 5/1990 | Dalson |
| 5,877,385 A | 3/1999 | Lee et al. |
| 6,281,398 B1 | 8/2001 | Belloir et al. |
| 6,398,947 B2 | 6/2002 | Beck et al. |
| 6,565,742 B1 | 5/2003 | Gentry et al. |
| 6,616,831 B1 | 9/2003 | Gentry et al. |
| 6,735,802 B1 | 5/2004 | Lundell et al. |
| 6,787,025 B2 | 9/2004 | Mukherjee et al. |
| 6,793,804 B1 | 9/2004 | Lindsay et al. |
| 7,507,325 B2 | 3/2009 | Gueret et al. |
| 7,678,262 B2 | 3/2010 | Barthelet et al. |
| 7,723,554 B2 | 5/2010 | Area et al. |
| 7,880,045 B2 | 2/2011 | Area et al. |
| 7,964,763 B2 | 6/2011 | Dixon et al. |
| 8,168,844 B2 | 5/2012 | Area et al. |
| 8,536,397 B2 | 9/2013 | Noll et al. |
| 8,932,451 B2 | 1/2015 | Strauss et al. |
| 8,975,462 B2 | 3/2015 | Kim et al. |
| 9,090,521 B2 | 7/2015 | Al-Haji |
| 9,109,169 B2 | 8/2015 | Al-Therwi et al. |
| 9,221,729 B1 | 12/2015 | Lee |
| 9,909,075 B2 | 3/2018 | Klein et al. |
| 10,006,821 B1 | 6/2018 | Boger |
| 10,053,401 B1 | 8/2018 | Beadle et al. |
| 10,093,873 B2 | 10/2018 | Koseoglu et al. |
| 10,294,172 B2 | 5/2019 | Beadle et al. |
| 10,508,066 B2 | 12/2019 | Koseoglu et al. |
| 10,759,723 B2 | 9/2020 | Koseoglu et al. |
| 10,844,295 B1 | 11/2020 | Koseoglu et al. |
| 10,899,685 B1 | 1/2021 | Koseoglu et al. |
| 11,377,609 B2 * | 7/2022 | Abudawoud .......... C10G 45/58 |
| 2001/0001448 A1 | 5/2001 | Kapoor et al. |
| 2013/0144097 A1 | 6/2013 | Bender et al. |
| 2013/0345486 A1 | 12/2013 | Noll et al. |
| 2015/0166435 A1 | 6/2015 | Serban et al. |
| 2015/0251973 A1 | 9/2015 | Tinger et al. |
| 2015/0299069 A1 | 10/2015 | Azam et al. |
| 2015/0299086 A1 | 10/2015 | Farha et al. |
| 2016/0010005 A1 * | 1/2016 | Koseoglu ............. C10B 57/045 208/45 |
| 2016/0045841 A1 | 2/2016 | Kaplan et al. |
| 2017/0145323 A1 | 5/2017 | Koseoglu |
| 2018/0230070 A1 | 8/2018 | Beadle et al. |
| 2019/0010411 A1 * | 1/2019 | Koseoglu ............... C10G 69/08 |
| 2019/0241486 A1 | 8/2019 | Koseoglu et al. |
| 2020/0039898 A1 | 2/2020 | Koseoglu et al. |
| 2021/0246386 A1 * | 8/2021 | Koseoglu ............... C10G 45/54 |
| 2021/0246387 A1 * | 8/2021 | Koseoglu ............... C10G 45/44 |
| 2021/0246388 A1 * | 8/2021 | Koseoglu ............... C10B 55/00 |

* cited by examiner

CONVERSION OF AROMATIC COMPLEX BOTTOMS TO USEFUL PRODUCTS IN AN INTEGRATED REFINERY PROCESS

TECHNICAL FIELD

The present disclosure relates to an integrated refinery process and associated system for converting aromatic complex bottoms into high value products. In particular, certain embodiments of the disclosure relate to an integrated refinery process and associated system for converting aromatic complex bottoms into high value products via adsorption of polyaromatic constituents in the aromatic complex bottoms.

BACKGROUND

Refinery products used for fuels are receiving increasing levels of attention. Product specifications are being scrutinized by governmental agencies whose interests are decreased emissions from mobile and stationary sources, and by the industries that produce the engines and vehicles that utilize these fuels. Regional and national regulations have been in place and continue to evolve concerning gasoline specifications, and automakers have proposed a set of limitations for gasoline and diesel to allow them to manufacture vehicles which will produce significantly lower emissions over their lifetime. Maximum sulfur, aromatics, and benzene levels of 10 parts per million by weight (ppmw), 35 volume percent (V %), and 1 V % or less, respectively, have been targeted as goals by regulators.

Historically, lead was added to gasoline to increase octane. When the use of lead was phased out due to environmental concerns, no direct substitute existed, and refiners instead have converted certain hydrocarbon molecules used in gasoline blending in order to achieve higher octane ratings. Catalytic reforming, which involves a variety of reactions in the presence of one or more catalysts in the presence of recycle and make-up hydrogen, is a widely used process for refining hydrocarbon mixtures to increase the yield of high octane gasoline.

Although benzene yields can be as high as 10 V % in reformates, no more than 1 V % can be present in typical gasoline pools. There currently exists methods to remove benzene from reformate, including separation processes and hydrogenation reaction processes. In separation processes, benzene is typically extracted with a solvent and then separated from the solvent in a membrane separation unit or other suitable unit operation. In hydrogenation reaction processes, the reformate is divided into fractions to concentrate the benzene and one or more benzene-rich fractions are hydrogenated.

In a typical refinery, naphtha is reformed after hydrodesulfurization to increase the octane number of the gasoline. The reformate contains a high level of benzene which must be reduced in order to meet requisite fuel specifications that are commonly in the range of from about 1-3 V % benzene, with certain geographic regions targeting a benzene content of less than 1 V %. Benzene hydrogenation is a well-established process that can be used to reduce the benzene content of the reformate product stream.

In a typical catalytic reforming process, a naphtha stream is first hydrotreated in a hydrotreating unit to produce a hydrotreated naphtha stream. Hydrotreating in conventional naphtha reforming systems generally occurs under relatively mild conditions that are effective to remove sulfur and nitrogen to less than 0.5 ppmw levels.

The hydrotreated naphtha stream is reformed in a reforming unit to produce a gasoline reformate product stream. In general, the operating conditions for reforming unit include a temperature in the range of from 400° C. to 560° C., and more typically from 450° C. to 560° C.; a pressure in the range of from 1 bar to 50 bars, and more typically from 1 bar to 20 bars; and a liquid hourly space velocity (LHSV) in the range of from 0.5 inverse hours ($h^{-1}$) to 20 $h^{-1}$, and more typically from 0.5 $h^{-1}$ to 2 $h^{-1}$. The reformate is sent to the gasoline pool to be blended with other gasoline components to meet the prescribed specifications.

A typical gasoline blending pool includes $C_4$ and heavier hydrocarbons having boiling points of less than about 205° C. In the catalytic reforming process, paraffins and naphthenes are restructured to produce isomerized paraffins and aromatics of relatively higher octane numbers. The catalytic reforming converts low octane n-paraffins to i-paraffins and naphthenes. Naphthenes are converted to higher octane aromatics. The aromatics are left essentially unchanged or some may be hydrogenated to form naphthenes due to reverse reactions taking place in the presence of hydrogen.

The reactions involved in catalytic reforming are commonly grouped into the four categories of cracking, dehydrocyclization, dehydrogenation and isomerization. A particular hydrocarbon/naphtha feed molecule may undergo more than one category of reaction and may form more than one product.

The catalysts for catalytic reforming processes are either mono-functional or bi-functional reforming catalysts which contain precious metals, such as IUPAC Groups 8-10 metals, as active components. A bi-functional catalyst has both metal sites and acidic sites. Refineries generally use a platinum catalyst or platinum alloy supported on alumina as the reforming catalyst. The hydrocarbon/naphtha feed composition, the impurities present therein, and the desired products will determine such process parameters as choice of catalyst(s), process type, and the like. Types of chemical reactions can be targeted by a selection of catalyst or operating conditions known to those of ordinary skill in the art to influence both the yield and selectivity of conversion of paraffinic and naphthenic hydrocarbon precursors to particular aromatic hydrocarbon structures.

There are several types of catalytic reforming process configurations which differ in the manner in which they regenerate the reforming catalyst to remove the coke formed in the reactors. Catalyst regeneration, which involves combusting the detrimental coke in the presence of oxygen, includes a semi-regenerative process, cyclic regeneration and continuous regeneration. Semi-regeneration is the simplest configuration, and the entire unit, including all reactors in the series is shut-down for catalyst regeneration in all reactors. Cyclic configurations utilize an additional "swing" reactor to permit one reactor at a time to be taken off-line for regeneration while the others remain in service. Continuous catalyst regeneration configurations, which are the most complex, provide for essentially uninterrupted operation by catalyst removal, regeneration and replacement. While continuous catalyst regeneration configurations include the ability to increase the severity of the operating conditions due to higher catalyst activity, the associated capital investment is necessarily higher.

The reformate is usually sent to an aromatics recovery complex (ARC) where it undergoes several processing steps in order to recover high value products, for example xylenes and benzene, and to convert lower value products, for example toluene, into higher value products. The aromatics present in the reformate are usually separated into different fractions by carbon number; such as benzene, toluene, xylenes, and ethylbenzene, etc. The $C_8$ fraction is then subjected to a processing scheme to produce more high value para-xylene. Para-xylene is usually recovered in high purity from the $C_8$ fraction by separating the para-xylene from the ortho-xylene, meta-xylene, and ethylbenzene using selective adsorption or crystallization. The ortho-xylene and meta-xylene remaining from the para-xylene separation are isomerized to produce an equilibrium mixture of para, ortho and meta-xylene. The ethylbenzene is isomerized into xylenes or is dealkylated to benzene and ethane. The para-xylene is then separated from the ortho-xylene and the meta-xylene using adsorption or crystallization and the para-xylene-depleted-stream is recycled to extinction back to the isomerization unit and then to the para-xylene recovery unit until all of the ortho-xylene and meta-xylene are converted to para-xylene and recovered.

Toluene is typically recovered as a separate fraction and then may be converted into higher value products, for example benzene in addition to or alternative to xylenes. One toluene conversion process involves the disproportionation of toluene to make benzene and xylenes. Another process involves the hydrodealkylation of toluene to make benzene. An alternate process involves the transalkylation of toluene with other alkylaromatics in the $C_{9+}$ stream to produce xylenes.

Both toluene disproportionation and toluene hydrodealkylation result in the formation of benzene. With the current and future anticipated environmental regulations involving benzene, it is desirable that the toluene conversion not result in the formation of significant quantities of benzene.

The problem faced by refineries is how to most economically reduce the benzene content in the reformate products sent to the gasoline pool by modifying the processes and apparatus of existing systems. However, as a by-product of the process described, the aromatic complex produces a reject stream or bottoms stream that is very heavy (boiling in the range of about 100-350° C.). In some refineries, the aromatic complex bottoms are added to the gasoline fraction. However, the aromatic complex bottoms deteriorate the gasoline quality and in the long run impact the engine performance negatively.

SUMMARY

Accordingly, there is a clear and long-standing need to provide a solution to utilize the aromatic complex bottoms in a value-added manner without polluting the gasoline pool through wholesale mixing therein.

In accordance with one or more embodiments of the present disclosure, a system for processing aromatic complex bottoms into high value products is disclosed. The system includes an inlet stream comprising crude oil; an atmospheric distillation unit (ADU), the ADU in fluid communication with the inlet stream, and operable to separate the inlet stream into an ADU tops stream and an ADU middle stream, the ADU tops stream comprising naphtha, and the ADU middle stream comprising diesel; a naphtha hydrotreating unit (NHT), the NHT in fluid communication with the ADU and operable to treat with hydrogen the naphtha in the ADU tops stream; a naphtha reforming unit (NREF), the NREF in fluid communication with the NHT and operable to reform a hydrotreated naphtha stream produced by the NHT, and the NREF further operable to produce separate hydrogen and reformate streams; an aromatics complex (ARC), the ARC in fluid communication with the NREF and operable to receive the reformate stream produced by the NREF, and the ARC further operable to separate the reformate stream into a gasoline pool stream, an aromatics stream, and an aromatic bottoms stream; and an adsorption column, the adsorption column in fluid communication with ARC and operable to receive the aromatic bottoms stream produced by the ARC, and the adsorption column further operable to remove polyaromatics from the aromatic bottoms stream to produce a cleaned aromatics bottoms stream with reduced polyaromatic content and a reject stream comprising the removed polyaromatics.

In some embodiments, the system further includes a coke production unit (CPU), the CPU in fluid communication with the adsorption column and operable to receive at least a portion of the reject stream produced by the adsorption column, and the CPU further operable to produce high quality coke from the reject stream.

In accordance with one or more embodiments of the present disclosure, an integrated method for processing aromatic complex bottoms into high value products is disclosed. The integrated method includes supplying an inlet stream comprising crude oil; separating the inlet stream into a tops stream and a middle stream, the tops stream comprising naphtha, and the middle stream comprising diesel; treating with hydrogen the naphtha in the tops stream to produce a hydrotreated naphtha stream; reforming the hydrotreated naphtha stream; producing separate hydrogen and reformate streams; separating the reformate stream into a gasoline pool stream, an aromatics stream, and an aromatic bottoms stream; and removing polyaromatics from the aromatic bottoms stream via processing in an adsorption column to generate a cleaned aromatic bottoms stream with reduced polyaromatic content and a reject stream.

In some embodiments, the integrated method further includes a step of generating high quality coke from the reject stream.

Additional features and advantages of the described embodiments will be set forth in the detailed description that follows. The additional features and advantages of the described embodiments will be, in part, readily apparent to those skilled in the art from that description or recognized by practicing the described embodiments, including the detailed description that follows as well as the drawings and the claims.

BRIEF DESCRIPTION OF THE DRAWINGS

The following detailed description of specific embodiments of the present disclosure can be best understood when read in conjunction with the following drawings in which.

Reference will now be made in greater detail to various embodiments, some embodiments of which are illustrated in the accompanying drawings. Whenever possible, the same reference numerals will be used throughout the drawings to refer to the same or similar units.

DETAILED DESCRIPTION

Embodiments of systems and associated methods for processing aromatic complex bottoms into high value products are provided in the present disclosure.

A system for processing aromatic complex bottoms into high value products includes an inlet stream comprising crude oil, an atmospheric distillation unit (ADU), a naphtha hydrotreating unit (NHT), a naphtha reforming unit (NREF), an aromatics complex (ARC), and an adsorption column. The ADU is in fluid communication with the inlet stream and operable to separate the inlet stream into an ADU tops stream and an ADU middle stream, the ADU tops stream comprising naphtha, and the ADU middle stream comprising diesel. Further, the NHT is in fluid communication with the ADU and operable to treat with hydrogen the naphtha in the ADU tops stream. The NREF is in fluid communication with the NHT and operable to reform a hydrotreated naphtha stream produced by the NHT. The NREF is further operable to produce separate hydrogen and reformate streams. Additionally, the ARC is in fluid communication with the NREF and operable to receive the reformate stream produced by the NREF with the ARC further operable to separate the reformate stream into a gasoline pool stream, an aromatics stream, and an aromatic bottoms stream. Finally, the adsorption column is in fluid communication with ARC and operable to receive the aromatic bottoms stream produced by the ARC with the adsorption column further operable to remove polyaromatics from the aromatic bottoms stream to produce a cleaned aromatics bottoms stream with reduced polyaromatic content and a reject stream comprising the removed polyaromatics.

The associated integrated method for processing aromatic complex bottoms into high value products includes supplying an inlet stream comprising crude oil; separating the inlet stream into a tops stream and a middle stream, the tops stream comprising naphtha, and the middle stream comprising diesel; treating with hydrogen the naphtha in the tops stream to produce a hydrotreated naphtha stream; reforming the hydrotreated naphtha stream; producing separate hydrogen and reformate streams; separating the reformate stream into a gasoline pool stream, an aromatics stream, and an aromatic bottoms stream; and removing polyaromatics from the aromatic bottoms stream to generate a cleaned aromatic bottoms stream with reduced polyaromatic content and a reject stream.

Having generally described the system for processing aromatic complex bottoms into high value products and associated methods, embodiments of the same are described in further detail and with reference to the various Figures.

Figure 1A:
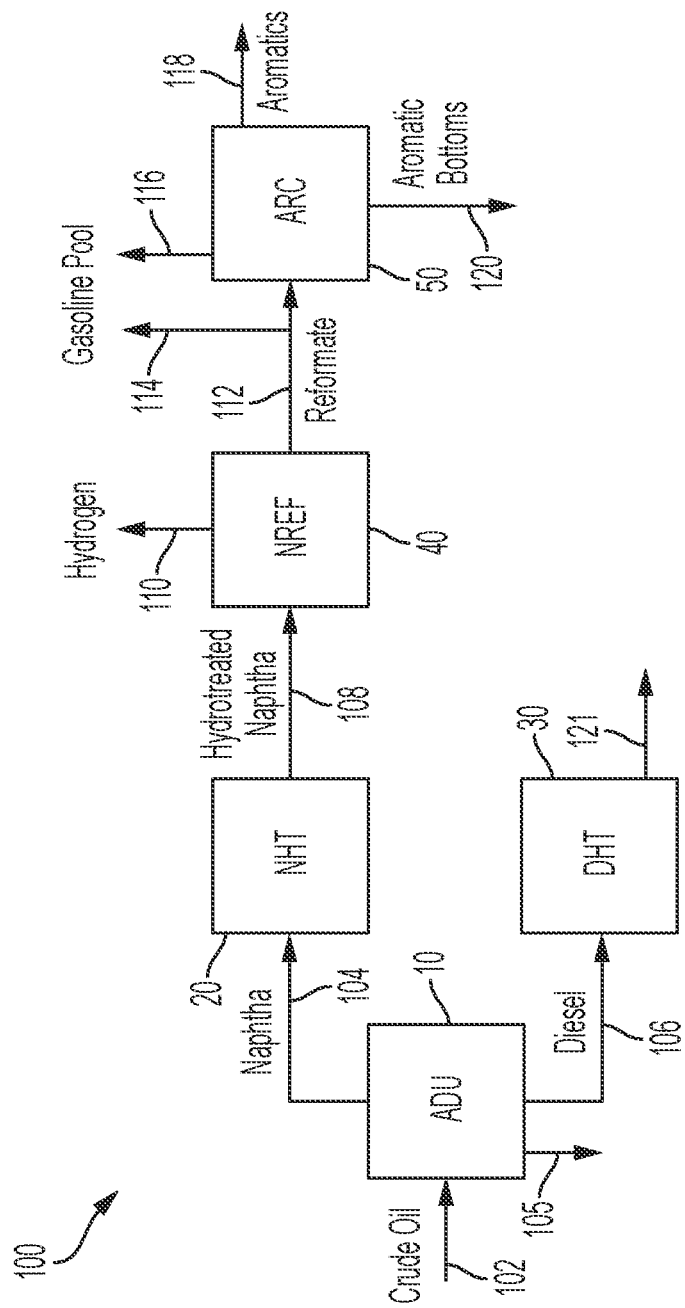
FIG. 1A is a schematic illustration of a conventional system for gasoline and aromatic production.

Referring first to FIG. 1A, a schematic of a conventional system for gasoline and aromatic production is shown. In the embodiment of FIG. 1A, a refinery with an aromatic complex is presented. In refining system 100, a crude oil inlet stream 102 is fluidly coupled to atmospheric distillation unit (ADU) 10, and crude oil from the crude oil inlet stream 102 is separated into naphtha stream 104, atmospheric residue stream 105, and diesel stream 106. Diesel stream 106 proceeds to diesel hydrotreating unit (DHT) 30, and naphtha stream 104 proceeds to naphtha hydrotreating unit (NHT) 20. A hydrotreated naphtha stream 108 exits NHT 20 and enters catalytic naphtha reforming unit (NREF) 40. A separated hydrogen stream 110 exits NREF 40, and a reformate stream 112 also exits NREF 40. A portion of reformate stream 112 enters aromatic complex (ARC) 50, and another portion of reformate stream 112 is separated by pool stream 114 to a gasoline pool. ARC 50 separates the reformate from reformate stream 112 into gasoline pool stream 116, aromatics stream 118, and aromatic bottoms 120.

Crude oil may be distilled in ADU 10 to recover naphtha, which boils in the range of about 36° C. to about 180° C., and diesel, which boils in the range of about 180° C. to about 370° C. An atmospheric residue fraction in atmospheric residue stream 105 boils at about 370° C. and higher. Naphtha stream 104 is hydrotreated in NHT 20 to reduce the sulfur and nitrogen content to less than about 0.5 ppmw, and the hydrotreated naphtha stream 108 is sent to NREF 40 to improve its quality, or in other words increase the octane number to produce gasoline blending stream or feedstock for an aromatics recovery unit. Diesel stream 106 is hydrotreated in DHT 30 to desulfurize the diesel oil to obtain a diesel fraction meeting stringent specifications at ultra-low sulfur diesel (ULSD) stream 121, such as, for example, less than 10 ppm sulfur. An atmospheric residue fraction is either used as a fuel oil component or sent to other separation or conversion units to convert low value hydrocarbons to high value products. Reformate stream 112 from NREF 40 can be used as a gasoline blending component or sent to an aromatic complex, such as ARC 50, to recover high value aromatics, such as benzene, toluene and xylenes.

Figure 1B:
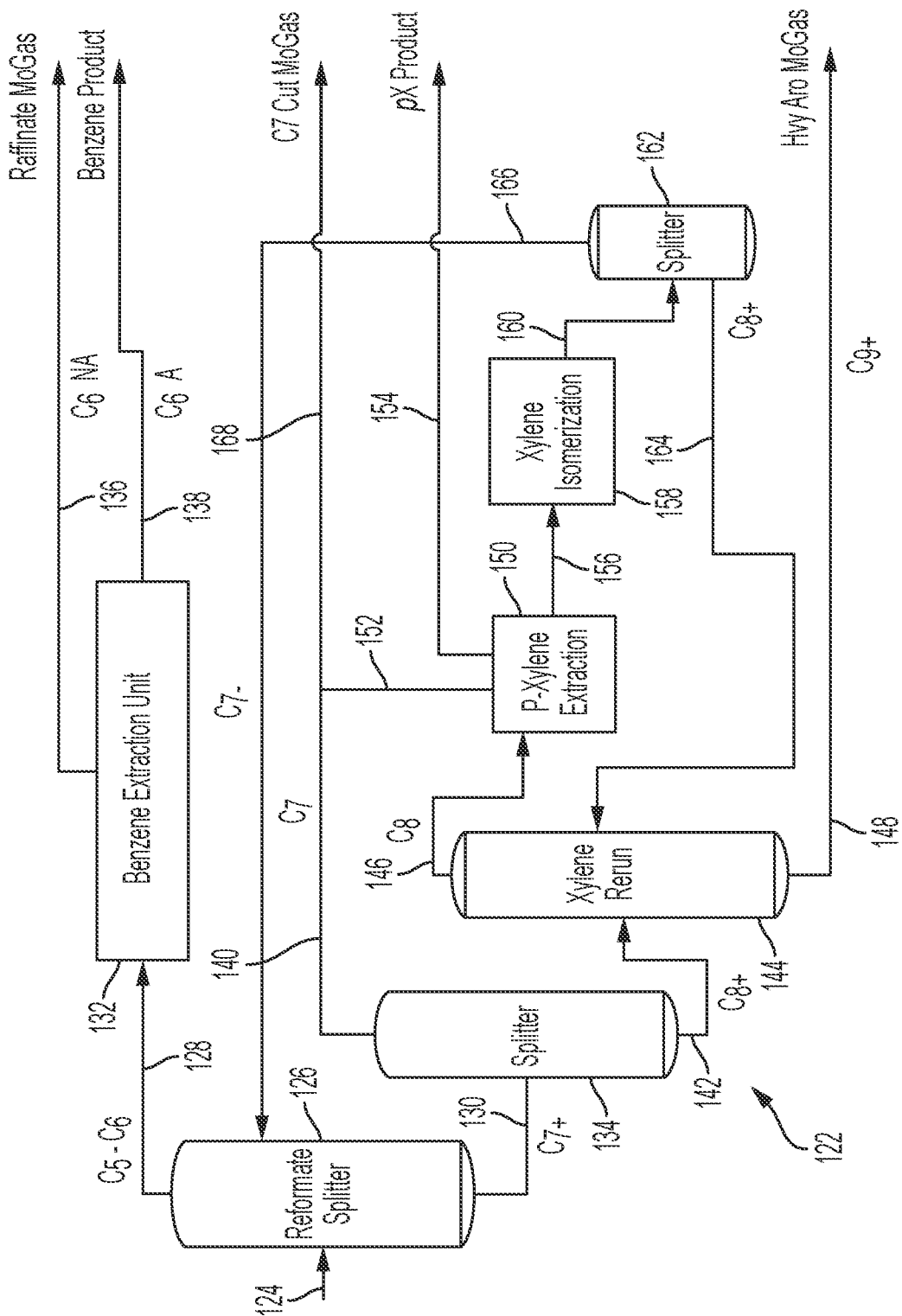
FIG. 1B is a schematic illustration of a conventional aromatics separation complex.

Referring now to FIG. 1B, a schematic of a prior art aromatics separation complex 122, such as, for example, ARC 50 of FIG. 1, is shown. Reformate stream 124 from a catalytic reforming unit, such as, for example, NREF 40 of FIG. 1, is split into two fractions: light reformate stream 128 with $C_5$-$C_6$ hydrocarbons, and heavy reformate stream 130 with $C_{7+}$ hydrocarbons. A reformate splitter 126 separates reformate stream 124. The light reformate stream 128 is sent to a benzene extraction unit 132 to extract the benzene as benzene product in stream 138, and to recover substantially benzene-free gasoline in raffinate motor gasoline (mogas) stream 136. The heavy reformate stream 130 is sent to a splitter 134 which produces a $C_7$ cut mogas stream 140 and a $C_{8+}$ hydrocarbon stream 142.

Still referring to FIG. 1B, a xylene rerun unit 144 separates $C_{8+}$ hydrocarbons into $C_8$ hydrocarbon stream 146 and $C_{9+}$ (heavy aromatic mogas) hydrocarbon stream 148. $C_8$ hydrocarbon stream 146 proceeds to p-xylene extraction unit 150 to recover p-xylene in p-xylene product stream 154. P-xylene extraction unit 150 also produces a $C_7$ cut mogas stream 152, which combines with $C_7$ cut mogas stream 140 to produce $C_7$ cut mogas stream 168. Other xylenes are recovered and sent to xylene isomerization unit 158 by stream 156 to convert them to p-xylene. The isomerized xylenes are sent to splitter column 162. The converted fraction is recycled back to p-xylene extraction unit 150 from splitter column 162 by way of streams 164 and 146. Splitter top stream 166 is recycled back to reformate splitter 126. The heavy fraction from the xylene rerun unit 144 is recovered as process reject or aromatic bottoms (shown as $C_{9+}$ and Hvy Aro MoGas in FIG. 1B at stream 148).

Figure 2:
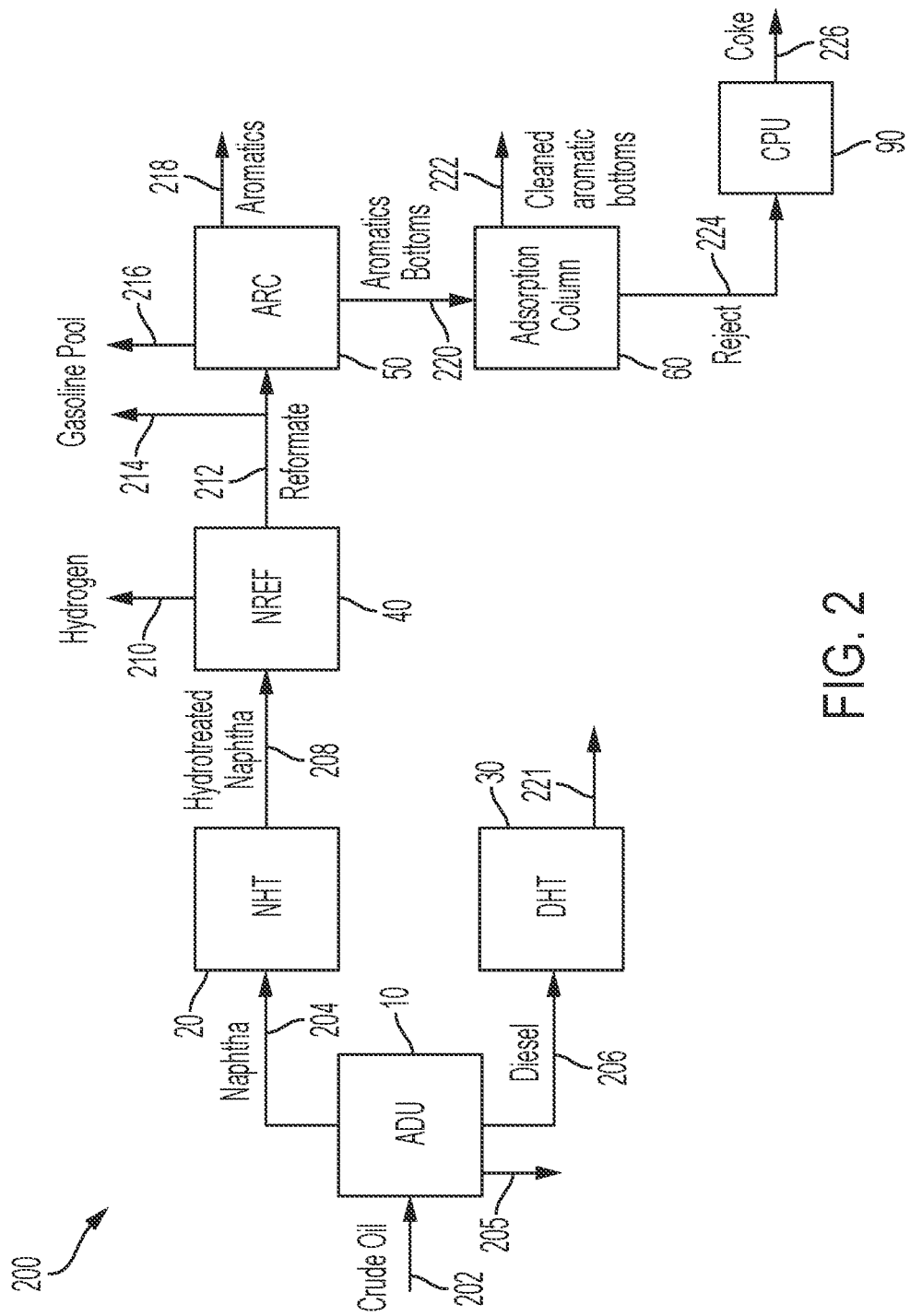
FIG. 2 is a schematic illustration of an embodiment of the present disclosure, in which aromatics bottoms are passed to an adsorption column.

Referring now to FIG. 2, a schematic is shown of an embodiment of the present disclosure, in which aromatic bottoms, for example aromatic bottoms 120 in FIG. 1A, are passed to an adsorption column 60. As described herein, the term "aromatics" includes $C_6$-$C_8$ aromatics, such as for example benzene and xylenes, for example streams 138, 154 in FIG. 1B, whereas "aromatic bottoms" include the heavier fraction, for example stream 148 in FIG. 1B ($C_9$+). Aromatic bottoms relate to $C_9$+ aromatics and may be a more complex mixture of compounds including di-aromatics. $C_9$+ aromatics boil in the range of about 100° C. to about 350° C.

Still referring to FIG. 2, in one or more embodiments of the system for processing aromatic complex bottoms into high value products 200, crude oil stream 202 feeds ADU 10. ADU 10 separates hydrocarbons from crude oil stream 202 into naphtha stream 204, atmospheric residue stream 205, and diesel stream 206. In one or more embodiments, the diesel stream 206 may be fed to DHT 30 to desulfurize the diesel oil and obtain a diesel fraction meeting stringent specifications as ultra-low sulfur diesel (ULSD) stream 221. Naphtha stream 204 may be fed to NHT 20 for processing. A hydrotreated naphtha stream 208 from the NHT 20 may be fed to NREF 40. NREF 40 produces a hydrogen stream 210 and a reformate stream 212. A portion or all of reformate stream 212 proceeds to a gasoline pool by way of stream 214, and a portion or all of reformate stream 212 may be fed to ARC 50. ARC 50 produces aromatics, for example benzene and xylenes, at stream 218 and aromatic bottoms at stream 220. A portion of hydrocarbons from ARC 50 goes to the gasoline pool by way of stream 216.

The aromatic bottoms 220 are passed to the adsorption column 60 to remove polyaromatics from the aromatic bottoms stream 220 to produce a cleaned aromatics bottoms stream 222 with reduced polyaromatic content and a reject stream 224 comprising the removed polyaromatics. In one or more embodiments, the cleaned aromatics bottoms stream 222 may be provided to the gasoline pool without further processing. In further embodiments, the cleaned aromatics bottoms stream 222 may be further processed to recover aromatics, including one or more of benzene, toluene, and xylenes.

The adsorption column 60 may be a typical fixed bed adsorption column familiar to those skilled in the art. The adsorbent placed within the adsorption column should be selected to be effective in the adsorption of polyaromatics from the aromatics bottoms stream 220. In various embodiments, the adsorbent may comprise activated carbon or a zeolite or silica or alumina or natural clays or spent catalysts from any refining processes or combination thereof. For example, activated carbon is a highly porous, amorphous solid consisting of microcrystallites with a graphite lattice and is typically used for adsorption of organic substances and non-polar adsorbates. The usefulness of activated carbon is believed to derive from its large micropore volume and the resulting high surface area. Further, zeolites are natural or synthetic crystalline aluminosilicates, which have a repeating pore network. In various embodiments, the adsorbent may comprise 0.1 to 80 wt. %, 20 to 40 wt. %, 25 to 35 wt. %, or approximately 30 wt. % USY zeolite as an extrudate with a binder. Further, in various embodiments, the zeolite-based adsorbent is selected from FAU, BEA, MOR, and MFI framework zeolites.

In one or more embodiments, the adsorption column 60 comprises a packed bed of the adsorbent. The packing can be in the form of pellets, spheres, extrudates or natural shapes, having a size of about 4 mesh to about 60 mesh, and in certain embodiments about 4 mesh to about 20 mesh, based on United States Standard Sieve Series.

In one or more embodiments, the adsorption column 60 comprises two or more independent columns which operate in an alternating or cyclical manner. Specifically, the adsorption column 60 may comprise at least two packed bed columns, which are gravity fed or pressure force-fed sequentially, in order to permit continuous operation when one bed is being regenerated. Such operation may be referenced as swing mode operation. Specifically, in the case of two columns, while one column of the adsorption column 60 is operating to elute the aromatic bottoms stream 220 the other column of the adsorption column 60 is operating to desorb the adsorbed polyaromatics. Such arrangement allows the system 200 to operate in a continuous manner with at least one column within the adsorption column 60 actively operating to elute the aromatic bottoms stream 220 at all times.

In one or more embodiments, the adsorption column 60 is operated at a pressure in the range of from about 1 kg/cm² to about 30 kg/cm², in certain embodiments about 1 kg/cm² to about 20 kg/cm², and in further embodiments about 1 kg/cm² to about 10 kg/cm², a temperature in the range of from about 20° C. to about 250° C., in certain embodiments about 20° C. to about 150° C., and in further embodiments about 20° C. to about 100° C.; and a liquid hourly space velocity of about 0.1 h⁻¹ to about 10 h⁻¹, in certain embodiments about 0.25 h⁻¹ to about 5 h⁻¹, and in further embodiments about 0.5 h⁻¹ to about 2 h⁻¹. The adsorbent can be desorbed by applying heat via inert nitrogen gas flow introduced at a pressure of from about 1 kg/cm² to about 30 kg/cm², in certain embodiments about 1 kg/cm² to about 20 kg/cm², and in further embodiments about 1 kg/cm² to about 10 kg/cm².

In embodiments in which the adsorbent is desorbed by solvent desorption, solvents can be selected based on their Hildebrand solubility factors or by their two-dimensional solubility factors. Solvents can be introduced at a solvent to oil volume ratio of about 1:1 to about 10:1.

The overall Hildebrand solubility parameter is a well-known measure of polarity and has been calculated for numerous compounds. The solvents can also be described by their two-dimensional solubility parameter. The complexing solubility parameter component, which describes the hydrogen bonding and electron donor acceptor interactions, measures the interaction energy that requires a specific orientation between an atom of one molecule and a second atom of a different molecule. The field force solubility parameter, which describes the van der Waals and dipole interactions, measures the interaction energy of the liquid that is not destroyed by changes in the orientation of the molecules.

In accordance with the desportion operations using a non-polar solvent or solvents (if more than one is employed) may have an overall Hildebrand solubility parameter of less than about 8.0 or the complexing solubility parameter of less than 0.5 and a field force parameter of less than 7.5. Suitable non-polar solvents include, e.g., saturated aliphatic hydrocarbons such as pentanes, hexanes, heptanes, paraffinic naphtha, $C_5$-$C_{11}$, kerosene $C_{12}$-$C_{15}$ diesel $C_{16}$-$C_{20}$, normal and branched paraffins, mixtures or any of these solvents. The preferred solvents are $C_5$-$C_7$ paraffins and $C_5$-$C_{11}$ parafinic naphtha.

In accordance with the desportion operations using polar solvent(s), solvents may be selected having an overall solubility parameter greater than about 8.5, or a complexing solubility parameter of greater than 1 and field force parameter of greater than 8. Examples of polar solvents meeting the desired minimum solubility parameter are toluene (8.91), benzene (9.15), xylenes (8.85), and tetrahydrofuran (9.52).

With continued reference to FIG. 2, in one or more embodiments of the system for processing aromatic complex bottoms into high value products 200, the reject stream 224 from the adsorption column 60 may be passed to a coke production unit (CPU) 90. Specifically, the CPU 90 may be provided in fluid communication with the adsorption column 60 and may be operable to receive at least a portion of the reject stream 224 produced by the adsorption column 60 and may be further operable to produce high quality coke 226 from the reject stream 224.

The CPU 90 may comprise a unit operation in accordance with systems and units known to those skilled in the art to convert hydrocarbon streams to high quality coke 226. For example, the CPU 90 may comprise a delayed coker unit including a coking furnace, two or more parallel drums, and a coking product fractionator. It will be appreciated the reject stream 224 may be fed to a delayed coker unit, in which the reject stream 224 is charged to a coking furnace where the contents are rapidly heated to a coking temperature in the range of 480° to 530° C. and then fed to a coking drum. The CPU 90 may be configured with two or more parallel drums and can be operated in a swing mode, such that when one of the drums is filled with coke, the heated reject stream 224 is transferred to the empty parallel drum to recover coke. Accordingly, an integrated and continuous or semi-continuous process may be provided to produce high quality coke 226. Further, in one or more embodiments, products from the coking drum(s) may be fed to a coking product fractionator where any hydrocarbon vapors remaining in the coke drum are removed by steam injection. Further, the generated high quality coke 226 may be cooled with water and then removed from the coke drum using hydraulic and mechanical means. In one or more embodiments, the high quality coke 226 may comprise needle or graphite quality coke.

Figure 3:
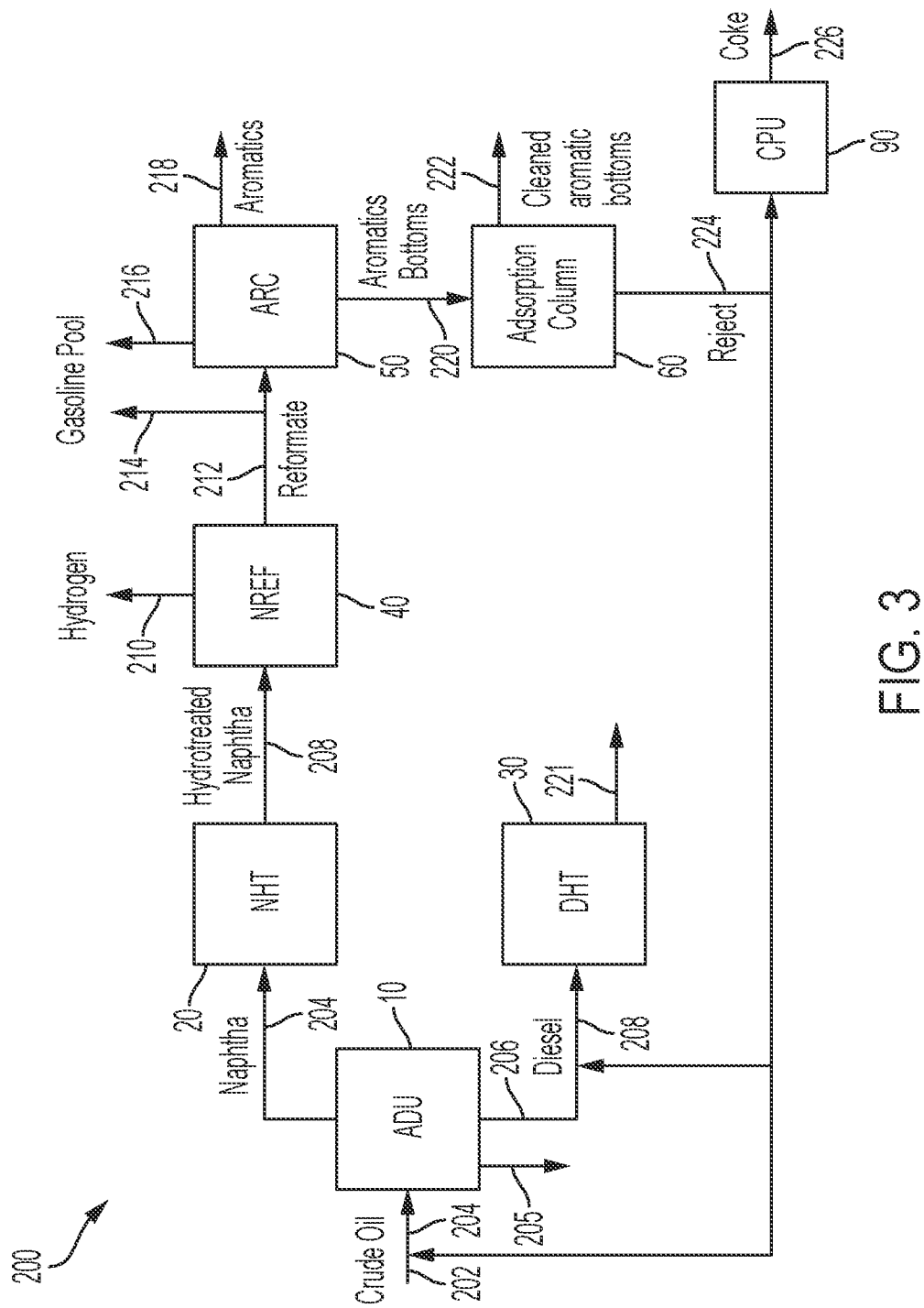
FIG. 3 is a schematic illustration of an embodiment of the present disclosure, in which at least a portion of a reject stream from an adsorption column is recycled back to an atmospheric distillation unit or diesel hydrotreating unit.

Referring now to FIG. 3, a schematic is shown of an embodiment of the present disclosure, in which the reject stream 224 may be recycled back to the ADU 10. At least a portion of the reject stream 224 may be combined with crude oil stream 202 to form hydrocarbon feed stream 204. Hydrocarbon feed stream 204 feeds the ADU 10 as a combined stream of crude oil and the reject stream 224. It will be appreciated that a portion of the reject stream 224 may also be provided to the CPU 90.

With continued reference to FIG. 3, in one or more embodiments, the reject stream 224 may be recycled back to the DHT 30. At least a portion of the reject stream 224 may be combined with diesel stream 206 to form diesel feed stream 208. Diesel feed stream 208 feeds the DHT 30 as a combined stream of the diesel stream 206 from the ADU 10 and the reject stream 224. It will be appreciated that a portion of the reject stream 224 may also be provided to the CPU 90, the ADU 10, or both. When recycled to the ADU 10 or the DHT 30, the reject stream 224 is combined with the feeds to such unit operations where the reject stream 224 may be further processed and hydrogenated fully or partially. The further processing of the reject stream 224 results in an increased fuel yield which may be advantageously utilized.

With further reference to FIGS. 2 and 3, in one or more embodiments, the ARC 50 may include a transalkylation unit. Transalkylation is a chemical reaction involving the transfer of an alkyl group from one organic compound to another and may be utilized for the transfer of methyl and ethyl groups between benzene rings allowing for the production of p-xylene, styrene, and other aromatic compounds. When there is a transalkylation unit provided as part of the ARC, the aromatic bottoms stream 220 comprises $C_{11+}$ aromatics. Conversely, when there is no transalkylation unit provided as part of the ARC, the aromatic bottoms stream 220 comprises $C_{9+}$ aromatics. The shift to an aromatics bottoms stream 220 comprising $C_{11+}$ aromatics results in increased recovery of BTX.

Figure 4:
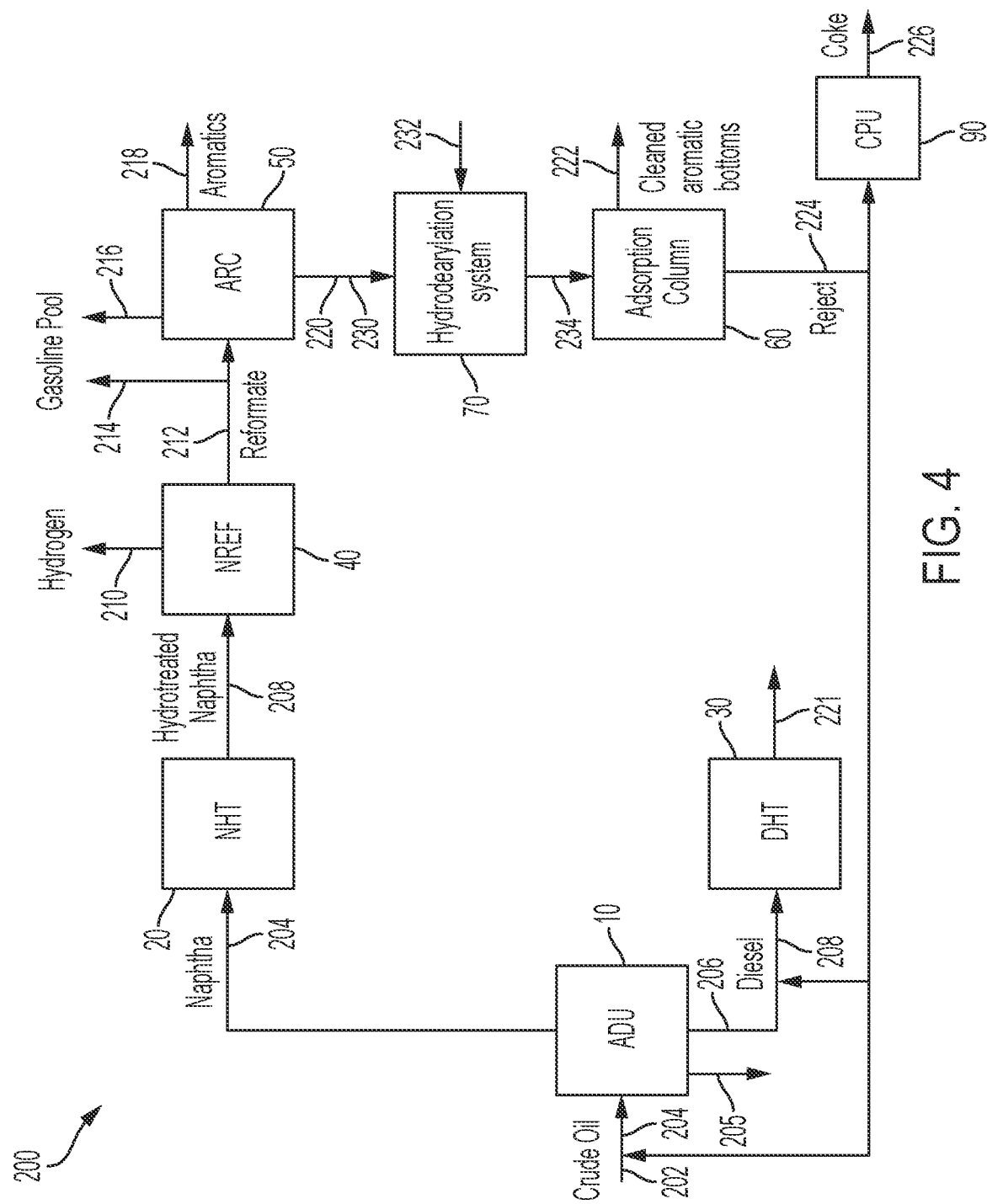
FIG. 4 is a schematic illustration of an embodiment of the present disclosure, in which aromatics bottoms are passed to a hydrodearylation system positioned prior to an adsorption column.

Referring now to FIG. 4, a schematic is shown of an embodiment of the present disclosure, in which the aromatics bottoms stream 220 is provided to a hydrodearylation system 70 prior to the adsorption column 60. An example hydrodearylation system is provided in U.S. Pat. No. 10,053,401 issued Aug. 21, 2018 and incorporated herein by reference in its entirety. Hydrodearylation is a process for the cleaving of the alkyl bridge of non-condensed alkyl-bridged multi-aromatics or heavy alkyl aromatic compounds to form alkyl mono-aromatics, in the presence a catalyst and hydrogen. In particular, the hydrodearylation system 70 may comprise a reactor housing an effective quantity of a suitable catalyst. The catalyst may be in a catalyst bed. The reactor includes an inlet for receiving a combined stream 230 including the aromatics bottoms stream 220 and a hydrogen stream 232. The hydrogen stream 232 may either enter the hydrodearyaltion unit 70 directly or being combined with stream 220 prior to entering the hydrodearylation unit 70. A hydrodearylated effluent stream 234 may be discharged from an outlet of the reactor. Having been processed by the hydrodearylation reactor, the hydrodearylated effluent stream 234 comprises a mixture of hydrocarbons that includes mono-aromatics and di-aromatics among other constituents which results in enhanced BTX recovery by the system 200. It will be appreciated that the hydrodearylated effluent stream 234 replaces the aromatics bottoms stream 220 as provided to the adsorption column 60 in various embodiments.

The hydrodearylated effluent stream 234 may be fractionated to separate the lighter mono-aromatics. In one or more embodiments, the lighter mono-aromatics maybe sent back to ARC 50 to recover benzene and xylenes. The heavy fraction may be sent to adsorption column 60 for further processing. In one or more embodiments, the fractionation of the hydrodearylated stream 234 may be at 180° C. for lighter ends, and as 180+° C. as the heavy stream. It will be appreciated that fractionation at 180° C. typically results in a split with a $C_9$ and $C_{10}$ cut for lighter ends and $C_{11+}$ compounds as the heavy stream. It will be appreciated that subjecting the hydrodearylated effluent stream 234 to fractioning may not affect the adsorption of polyaromatics in adsorption column 60, but the flow pathways are significant as they affect sizing of equipment. Specifically, the lighter components if directed to the ADU 10 ultimately return to the ARC 50. Similarly removal of the lighter components results in a reduction in the flow rate to the adsorption column 60 and process conditions may vary to account for variance in flow rate as well as composition.

In various embodiments, the hydrodearylation reactor may have a single catalyst bed or multiple catalyst beds and may receive a quench hydrogen stream in between the beds of a multi-bed arrangement. Although not shown, the quench hydrogen stream may be a portion of the hydrogen stream 232 piped to the various locations of the catalyst beds in the reactor.

Figure 5:
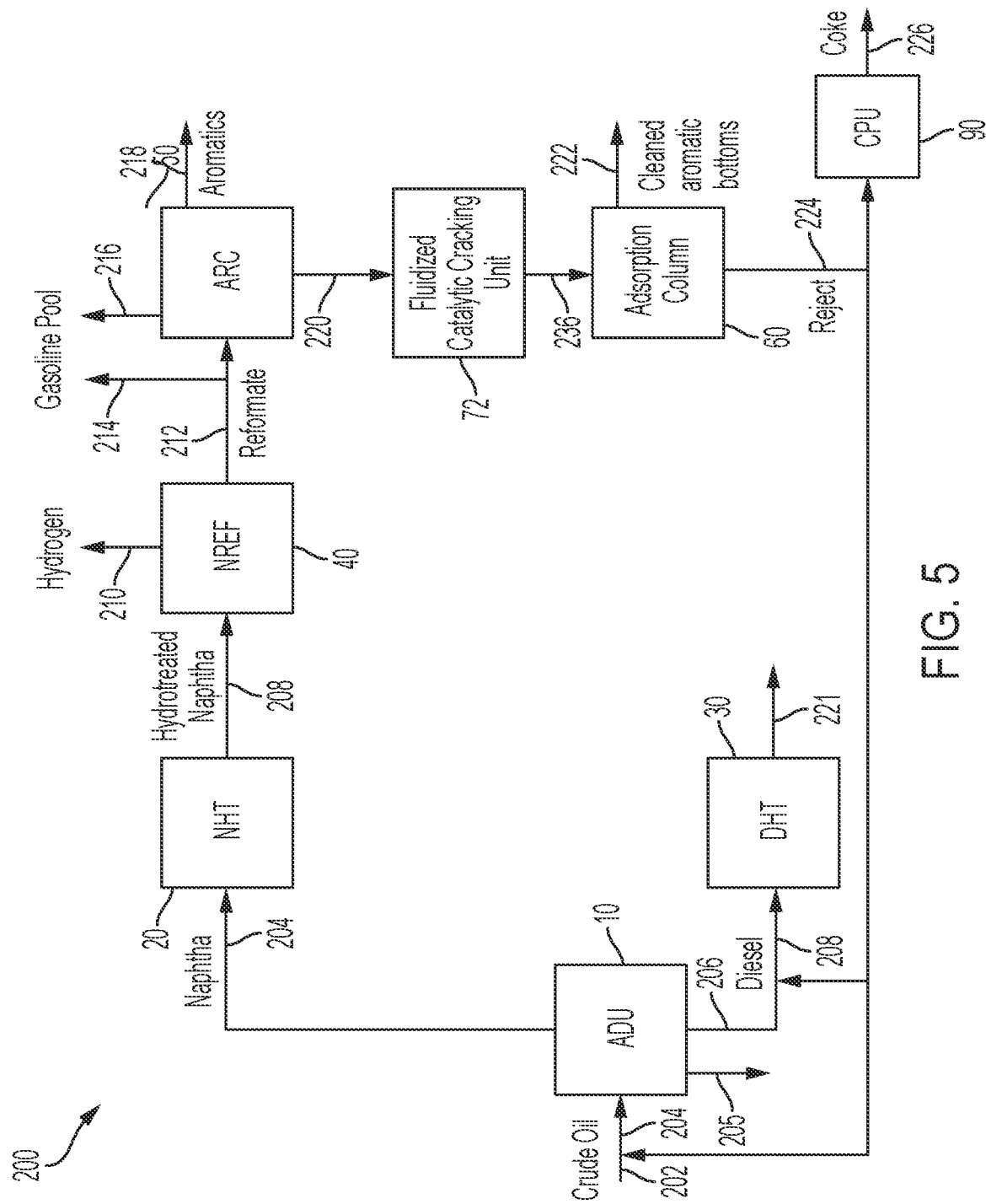
FIG. 5 is a schematic illustration of an embodiment of the present disclosure, in which aromatics bottoms are passed to a fluidized catalytic cracking unit positioned prior to an adsorption column.

Referring now to FIG. 5, a schematic is shown of an embodiment of the present disclosure, in which the aromatics bottoms stream 220 is provided to a fluidized catalytic cracking unit 72 prior to the adsorption column 60. Fluid catalytic cracking (FCC) is an understood conversion process used in petroleum refineries and is utilized to convert the high-boiling, high-molecular weight hydrocarbon fractions of petroleum crude oils into more valuable gasoline, olefinic gases, and other products. In particular, the fluidized catalytic cracking unit 72 may comprise a riser reactor which converts the aromatic bottoms stream 220 to BTX and other shorter chain hydrocarbons. It will further be appreciated that the fluidized catalytic cracking unit 72 may be a separate unit within a refinery or be an existing unit already implemented within the refinery used on an ad-hoc basis.

In one or more embodiments, the fluidized catalytic cracking unit 72 may include a reactor/separator as well as a regeneration vessel for regenerating spent catalyst. The aromatic bottoms stream 220 may be introduced to the reactor, in certain embodiments accompanied by steam or other suitable gas for atomization of the feed stream (not shown). The aromatic bottoms stream 220 is admixed and intimately contacted with an effective quantity of heated fresh or regenerated solid cracking catalyst particles which catalytically crack relatively large hydrocarbon molecules by carbon-carbon bond cleavage. The catalytically cracked aromatic bottoms stream 220 and the solid cracking catalyst are separated to form a catalytic cracking products stream 236 comprising the catalytically cracked aromatic bottoms stream 220. The solid cracking catalyst is cycled to the regeneration vessel for regeneration of the catalyst. Having been processed by the fluidized catalytic cracking unit 72, the catalytic cracking products stream 236 comprises increased BTX from conversion of the bridged non-condensed aromatics to BTX through the catalytic cracking. It will be appreciated that the catalytic cracking products stream 236 replaces the aromatics bottoms stream 220 as provided to the adsorption column 60 in various embodiments.

Further, it will be appreciated that in one or more embodiments, the catalytic cracking products stream 236 may be fractionated to separate the lighter mono-aromatics as expansively disclosed with regards to the hydrodearylated effluent stream 234 before passage to the adsorption column 60. Such further processing as detailed with regards to the hydrodearylated effluent stream 234 is explicitly indicated as applicable to the catalytic cracking products stream 236 as well.

Figure 6:
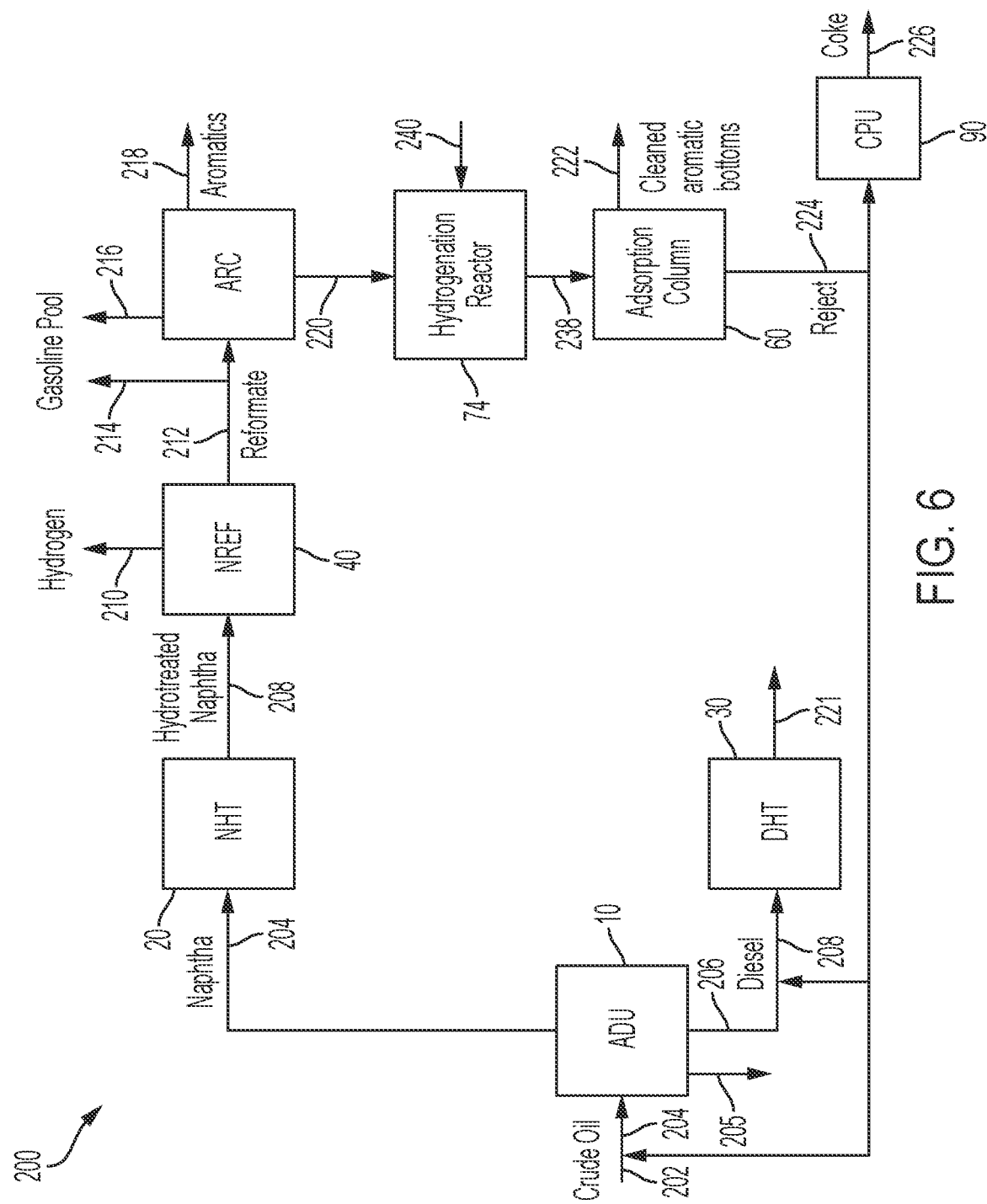
FIG. 6 is a schematic illustration of an embodiment of the present disclosure, in which aromatics bottoms are passed to a hydrogenation reactor positioned prior to an adsorption column.

Referring now to FIG. 6, a schematic is shown of an embodiment of the present disclosure, in which the aromatics bottoms stream 220 is provided to a hydrogenation reactor 74 prior to the adsorption column 60. It will be appreciated that hydrogenation is a chemical reaction between a compound and hydrogen. For example, hydrogenation may involve an unsaturated hydrocarbon, such as an alkene or alkyne, being reduced in the presence of hydrogen to form a saturated (or more saturated) hydrocarbon. In one or more embodiments, the hydrogenation rector 74 is a fixed-bed catalytic reactor. In particular, the hydrogenation rector 74 may comprise an inlet for receiving a combined stream including the aromatics bottoms stream 220 and a hydrogen stream 240 or alternatively the hydrogenation rector 74 may comprise individual separate inlets for including the aromatics bottoms stream 220 and the hydrogen stream 240. A hydrogenated effluent stream 238 may be discharged from an outlet of the hydrogenation reactor 74. Having been processed by the hydrogenation reactor 74, the hydrogenated effluent stream 240 comprises a mix of hydrocarbons such as mono-aromatics, di-aromatics, tri-aromatics, naphthenes, and paraffins which results in enhanced BTX recovery by the system 200. It will be appreciated that the hydrogenated effluent stream 238 replaces the aromatics bottoms stream 220 as provided to the adsorption column 60 in various embodiments.

In one or more embodiments, the aromatics bottoms stream 220 is provided to a hydrocracking unit prior to the adsorption column 60. The hydrocracking unit fundamentally combines the fluidized catalytic cracking unit 72 as illustrated in FIG. 5 with the hydrogenation rector 74 as illustrated in FIG. 6. Specifically, there are two main chemical reactions occurring in the hydrocracking unit: catalytic cracking of heavy hydrocarbons into lighter unsaturated hydrocarbons as in the fluidized catalytic cracking unit 72 and the saturation of these newly formed hydrocarbons with hydrogen as in the hydrogenation rector 74. A hydrocracked effluent stream may be discharged from an outlet of the hydrocracking unit. It will be appreciated that the hydrocracked effluent stream replaces the aromatics bottoms stream 220 as provided to the adsorption column 60 in various embodiments.

Further, it will be appreciated that in one or more embodiments, the aromatics bottoms stream 220 may be fractionated to separate the lighter mono-aromatics as expansively disclosed with regards to the hydrodearylated effluent stream 234 before passage to the adsorption column 60. Such further processing as detailed with regards to the hydrodearylated effluent stream 234 is explicitly indicated as applicable to the aromatics bottoms stream 220 as well.

EXAMPLES

The following examples illustrate features of the present disclosure but are not intended to limit the scope of the disclosure.

To demonstrate the utility of utilization of an adsorption column to remove polyaromatics from the aromatics bottoms stream produced by the atmospheric distillation unit, representative testing was completed. Specifically, aromatic bottoms stream samples representing the aromatics bottom produced by an atmospheric distillation unit such as ARC 50 were processed in an adsorption column consistent with embodiments of the present disclosure. The composition of the aromatic bottom utilized for testing is provided in Table 1 and the properties of the aromatic bottom utilized for testing are provided in Table 2.

TABLE 1

| Composition of Aromatic Bottom Stream | | |
| --- | --- | --- |
| Mono-Aromatics (MA) and Naphtheno Mono-Aromatics (NMA) | Wt. % | 56.29 |
| Di-Aromatics (DA) | Wt. % | 42.57 |
| Naphtheno Di-Aromatics (NDA) | Wt. % | 0.62 |
| Tri-Aromatics (TrA) | Wt. % | 0.36 |
| Tetra+ Aromatics (TeA) | Wt. % | 0.15 |

TABLE 2

Properties of Aromatic Bottoms Stream

| Density | Kilograms per liter (Kg/l) | 0.9227 |
| --- | --- | --- |
| Initial Boiling Point (IBP) | ° C. | 182 |
| 5 Wt. % Boiling Point | ° C. | 183 |
| 10 Wt. % Boiling Point | ° C. | 183 |
| 30 Wt. % Boiling Point | ° C. | 184 |
| 50 Wt. % Boiling Point | ° C. | 208 |
| 70 Wt. % Boiling Point | ° C. | 302 |
| 90 Wt. % Boiling Point | ° C. | 330 |
| 95 Wt. % Boiling Point | ° C. | 337 |
| Final Boiling Point (FBP) | ° C. | 350 |

Inventive Example 1

In a first test, an adsorption column packed with an activated carbon adsorbent was utilized. Testing was completed on bench top equipment scaled-up on the basis of 10,000 kilograms (Kg) of the aromatics bottoms stream. As such, 10,000 kg of aromatics bottoms stream containing $C_{9+}$ aromatics was fed to the adsorption column packed with an activated carbon adsorbent. The aromatics bottoms stream was in accordance with the composition and properties of Table 1 and Table 2 respectively. The adsorption column was operated at liquid hourly space velocity of 1 $h^{-1}$, 20° C. and at 1 bar of pressure. After the elution by gravity, the column was flushed with 10,000 kg of toluene. Toluene was distilled off from the effluent and the recovered aromatic stream was combined with the recovered effluent as a cleaned aromatic bottoms stream. The column was then washed with 10,000 Kg of tetrahydrofuiran to recover the adsorbed polyaromatics as a reject stream. The overall material balance for the adsorption section is shown in Table 3. The adsorption process yielded 9703.1 kg of aromatics in the cleaned aromatic bottoms stream and 296.9 Kg of aromatics in the reject stream containing polyaromatics.

TABLE 3

Composition of Process Streams - Inventive Example 1

| | Aromatic Bottoms Stream (Kg) | Cleaned Aromatic Bottoms Stream (Kg) | Reject Stream (Kg) |
| --- | --- | --- | --- |
| MA and NMA | 5629.6 | 5607.8 | 21.8 |
| DA | 4257.4 | 3995.0 | 262.4 |
| NDA | 62.0 | 60.2 | 1.8 |
| TrA | 36.0 | 27.5 | 8.5 |
| TeA | 15.0 | 12.6 | 2.4 |
| TOTAL | 10,000 | 9,703.1 | 296.9 |

Inventive Example 2

In a second test, an adsorption column packed with an adsorbent containing 30 Wt. % USY zeolite was utilized. Testing was completed on bench top equipment scaled-up on the basis of 10,000 Kg of the aromatics bottoms stream. As such, 10,000 kg of aromatics bottoms stream containing $C_9$ aromatics was fed to the adsorption column packed with an adsorbent containing 30 Wt. % USY zeolite. The aromatics bottoms stream was in accordance with the composition and properties of Table 1 and Table 2 respectively. The adsorption column was operated at liquid hourly space velocity of 1 $h^{-1}$, 20° C. and at 1 bar of pressure. After the elution, the column was flushed with 10,000 kg of toluene. Toluene was distilled off from the effluent and the recovered aromatic stream was combined with the recovered effluent as a cleaned aromatic bottoms stream. The column was then washed with 10,000 Kg of tetrahydrofuiran to recover the adsorbed polyaromatics as a reject stream. The overall material balance for the adsorption section is shown in Table 4. The adsorption process yielded 8953.8 kg of aromatics in the cleaned aromatic bottoms stream and 1046.2 Kg of aromatics in the reject stream containing polyaromatics.

TABLE 4

Composition of Process Streams - Inventive Example 2

| | Aromatic Bottoms Stream (Kg) | Cleaned Aromatic Bottoms Stream (Kg) | Reject Stream (Kg) |
| --- | --- | --- | --- |
| MA and NMA | 5629.6 | 5115.5 | 514.1 |
| DA | 4257.4 | 3742.6 | 514.7 |
| NDA | 62.0 | 58.6 | 3.5 |
| TrA | 36.0 | 27.6 | 8.4 |
| TeA | 15.0 | 9.5 | 5.5 |
| TOTAL | 10000 | 8953.8 | 1046.2 |

Figure 7:
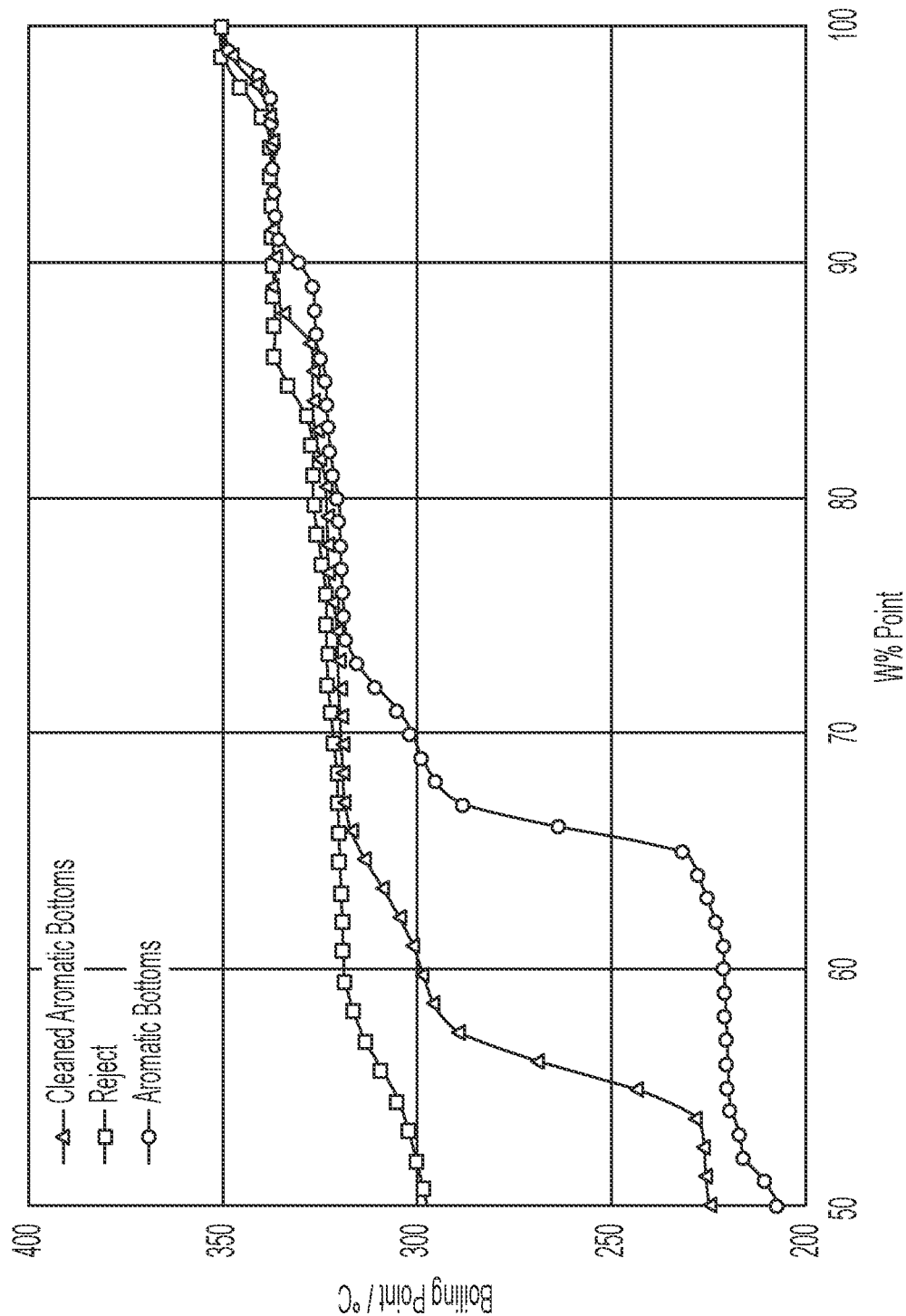
FIG. 7 is a simulated distillation curve for the products of the adsorption column housing activated carbon adsorbent in accordance with one or more embodiments of the integrated refinery process of the present disclosure.
Figure 8:
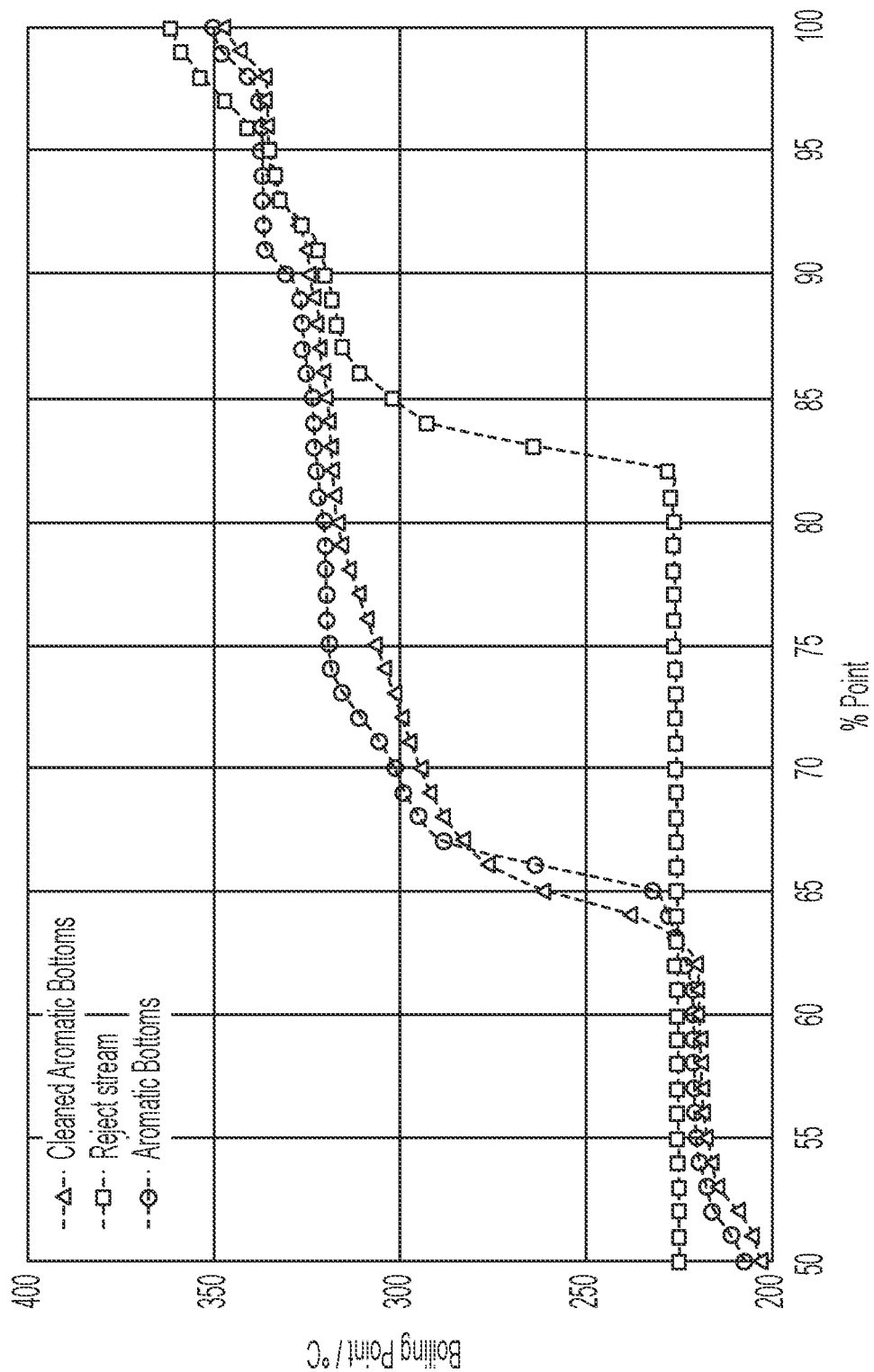
FIG. 8 is a simulated distillation curve for the products of the adsorption column housing a zeolite-based adsorbent in accordance with one or more embodiments of the integrated refinery process of the present disclosure.

Simulated distillation of the aromatic bottoms stream as well as the cleaned aromatic bottoms stream and rejected stream from each of the Inventive Example tests was performed. FIG. 7 provides the distillation curve for Inventive Example 1 with activate carbon adsorbent being utilized. Similarly, FIG. 8 provides the distillation curve for Inventive Example 2 with zeolite based adsorbent being utilized. The distillation curves of FIGS. 7 and 8 are provided between 50 wt. % and 100 wt. % and illustrates the differences between the feedstock and product streams as well as between the adsorbents. With reference to FIG. 7, the reject stream is demonstrated as heavier in nature as it boils at high temperatures. For example, 50 wt. % boils off at about 300° C., the aromatic bottoms stream (feedstock) boils at around 210° C., and the cleaned aromatic bottoms stream boils at around 225° C. The distillation curve shifted to lesser equivalent percentage points for the cleaned aromatic bottoms compared to the aromatic bottoms feedstock showing the degree of separation of heavy molecules from the feed aromatic bottoms stream. With reference to FIG. 8, shifts in the distillation curves are also observed and understood by those skilled in the art.

It should now be understood the various aspects of the system and integrated method for processing aromatic complex bottoms into high value products are described and such aspects may be utilized in conjunction with various other aspects.

According to a first aspect, a system for processing aromatic complex bottoms into high value products includes an inlet stream comprising crude oil; an atmospheric distillation unit (ADU), the ADU in fluid communication with the inlet stream, and operable to separate the inlet stream into an ADU tops stream and an ADU middle stream, the ADU tops stream comprising naphtha, and the ADU middle stream comprising diesel; a naphtha hydrotreating unit (NHT), the NHT in fluid communication with the ADU and operable to treat with hydrogen the naphtha in the ADU tops stream; a naphtha reforming unit (NREF), the NREF in fluid communication with the NHT and operable to reform a hydrotreated naphtha stream produced by the NHT, and the NREF further operable to produce separate hydrogen and reformate streams; an aromatics complex (ARC), the ARC in fluid communication with the NREF and operable to receive the reformate stream produced by the NREF, and the ARC further operable to separate the reformate stream into a gasoline pool stream, an aromatics stream, and an aromatic bottoms stream; and an adsorption column, the adsorption column in fluid communication with ARC and operable to receive the aromatic bottoms stream produced by the ARC, and the adsorption column further operable to remove polyaromatics from the aromatic bottoms stream to produce a cleaned aromatics bottoms stream with reduced polyaromatic content and a reject stream comprising the removed polyaromatics.

A second aspect includes the system of the first aspect in which the system further comprises a coke production unit (CPU), the CPU in fluid communication with the adsorption column and operable to receive at least a portion of the reject stream produced by the adsorption column, and the CPU further operable to produce high quality coke from the reject stream.

A third aspect includes the system of the first or second aspect in which the system further comprises a diesel hydrotreating unit (DHT), the DHT in fluid communication with a diesel inlet stream, the diesel inlet stream comprising fluid flow from the ADU middle stream, and the DHT operable to treat the diesel inlet stream with hydrogen.

A fourth aspect includes the system of the third aspect in which the reject stream is in fluid communication with the diesel inlet stream such that the diesel inlet stream comprises fluid flow from the reject stream in combination with the fluid flow from the ADU middle stream.

A fifth aspect includes the system of any of the first through fourth aspects in which the reject stream is in fluid communication with the ADU such that at least a portion of the reject stream may be recycled back to the ADU.

A sixth aspect includes the system of any of the first through fifth aspects in which the aromatic bottoms stream comprises aromatic compounds with boiling points in the range of about 100° C. to about 350° C.

A seventh aspect includes the system of any of the first through sixth aspects in which the cleaned aromatic bottoms stream is used as a gasoline blending component without any further treatment.

An eighth aspect includes the system of any of the first through seventh aspects in which the cleaned aromatic bottoms stream is processed further to produce benzene, toluene, and xylenes.

A ninth aspect includes the system of any of the second through eighth aspects in which the high quality coke comprises needle or graphite quality coke.

A tenth aspect includes the system of any of the first through ninth aspects in which the system further comprises a hydrodearylation system, the hydrodearylation system intermediately positioned in fluid communication between the ARC and the adsorption column and operable to receive and process the aromatic bottoms stream for provision as a hydrodearylated effluent stream to the adsorption column.

An eleventh aspect includes the system of any of the first through ninth aspects in which the system further comprises a fluidized catalytic cracking unit, the fluidized catalytic cracking unit intermediately positioned in fluid communication between the ARC and the adsorption column and operable to receive and process the aromatic bottoms stream for provision as a catalytic cracking products stream to the adsorption column.

A twelfth aspect includes the system of any of the first through ninth aspects in which the system further comprises a hydrogenation reactor, the hydrogenation reactor intermediately positioned in fluid communication between the ARC and the adsorption column and operable to receive and process the aromatic bottoms stream for provision as a hydrogenated effluent stream to the adsorption column.

A thirteenth aspect includes the system of any of the first through ninth aspects in which the system further comprises a hydrocracking reactor, the hydrocracking reactor intermediately positioned in fluid communication between the ARC and the adsorption column and operable to receive and process the aromatic bottoms stream for provision as a hydrocracked effluent stream to the adsorption column.

A fourteenth aspect includes the system of any of the first through thirteenth aspects in which the ARC comprises a transalkylation unit.

According to a fifteenth aspect, an integrated method for processing aromatic complex bottoms into high value products includes supplying an inlet stream comprising crude oil; separating the inlet stream into a tops stream and a middle stream, the tops stream comprising naphtha, and the middle stream comprising diesel; treating with hydrogen the naphtha in the tops stream to produce a hydrotreated naphtha stream; reforming the hydrotreated naphtha stream; producing separate hydrogen and reformate streams; separating the reformate stream into a gasoline pool stream, an aromatics stream, and an aromatic bottoms stream; and removing polyaromatics from the aromatic bottoms stream via processing in an adsorption column to generate a cleaned aromatic bottoms stream with reduced polyaromatic content and a reject stream.

A sixteenth aspect includes the method of the fifteenth aspect in which the method further comprises a step of generating high quality coke from the reject stream.

A seventeenth aspect includes the method of the fifteenth or sixteenth aspect in which the method further comprises treating the middle stream comprising diesel with hydrogen.

An eighteenth aspect includes the method of the seventeenth aspect in which the method further comprises recycling at least a portion of the reject stream to the middle stream comprising diesel; and treating the middle stream comprising diesel and the aromatic bottoms stream with hydrogen.

A nineteenth aspect includes the method of any of the fifteenth through eighteenth aspects in which the method further comprises recycling at least a portion of the reject stream to the inlet stream.

A twentieth aspect includes the method of any of the fifteenth through nineteenth aspects in which the method further comprises hydrodearylating the aromatic bottoms stream to generate a hydrodearylated effluent stream; and removing polyaromatics from the hydrodearylated effluent stream in lieu of the aromatics bottoms stream to generate the cleaned aromatic bottoms stream with reduced polyaromatic content and the reject stream.

A twenty-first aspect includes the method of any of the fifteenth through nineteenth aspects in which the method further comprises fluidized catalytically cracking the aromatic bottoms stream to generate a catalytic cracking products stream; and removing polyaromatics from the catalytic cracking products stream in lieu of the aromatics bottoms stream to generate the cleaned aromatic bottoms stream with reduced polyaromatic content and the reject stream.

A twenty-second aspect includes the method of any of the fifteenth through nineteenth aspects in which the method further comprises hydrogenating the aromatic bottoms stream to generate a hydrogenated effluent stream; and removing polyaromatics from the hydrogenated effluent stream in lieu of the aromatics bottoms stream to generate the cleaned aromatic bottoms stream with reduced polyaromatic content and the reject stream.

A twenty-third aspect includes the method of any of the fifteenth through nineteenth aspects in which the method further comprises hydrocracking the aromatic bottoms stream to generate a hydrocracked effluent stream; and removing polyaromatics from the hydrocracked effluent stream in lieu of the aromatics bottoms stream to generate the cleaned aromatic bottoms stream with reduced polyaromatic content and the reject stream.

A twenty-fourth aspect includes the method of any of the fifteenth through twenty-third aspects in which the cleaned aromatic bottoms stream is used as a gasoline blending component without any further treatment.

A twenty-fifth aspect includes the method of any of the fifteenth through twenty-fourth aspects in which the cleaned aromatic bottoms stream is processed further to produce benzene, toluene, and xylenes.

A twenty-sixth aspect includes the method of any of the sixteenth through twenty-fifth aspects in which the high quality coke comprises needle or graphite quality coke.

A twenty-seventh aspect includes the system of any of the first through fourteenth aspects in which the adsorption column comprises a zeolite-based adsorbent.

A twenty-eighth aspect includes the system of the twenty-seventh aspect in which the zeolite-based adsorbent is selected from FAU, BEA, MOR, and MFI framework zeolites.

A twenty-ninth aspect includes the system of any of the first through fourteenth aspects in which the adsorption column comprises an activated carbon based adsorbent.

A thirtieth aspect includes the method of any of the fifteenth through twenty-sixth aspects in which the adsorption column comprises a zeolite-based adsorbent.

A thirty-first aspect includes the method of the thirtieth aspect in which the zeolite-based adsorbent is selected from FAU, BEA, MOR, and MFI framework zeolites.

A thirty-second aspect includes the method of any of the fifteenth through twenty-sixth aspects in which the adsorption column comprises an activated carbon based adsorbent.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. A system for processing aromatic complex bottoms into high value products, the system comprising:

an inlet stream comprising crude oil;

an atmospheric distillation unit (ADU), the ADU in fluid communication with the inlet stream, and operable to separate the inlet stream into an ADU tops stream and an ADU middle stream, the ADU tops stream comprising naphtha, and ADU middle stream comprising diesel;

a naphtha hydrotreating unit (NHT), the NHT in fluid communication with the ADU and operable to treat with hydrogen the naphtha in the ADU tops stream;

a naphtha reforming unit (NREF), the NREF in fluid communication with the NHT and operable to reform a hydrotreated naphtha stream produced by the NHT, and the NREF, further operable to produce separate hydrogen and reformate streams;

an aromatics complex (ARC), the ARC in fluid communication with the NREF and operable to receive the reformate stream produced by the NREF, and the ARC further operable to separate the reformate stream into a gasoline pool stream, an aromatics stream, and an aromatic bottoms stream;

an adsorption column, the adsorption column in fluid communication with the ARC and operable to receive the aromatic bottoms stream produced by the ARC, and the adsorption column further operable to remove polyaromatics from the aromatic bottoms stream to produce a cleaned aromatics bottoms stream with reduced polyaromatic content and a reject stream comprising the removed polyaromatics; and a coke production unit (CPU), the CPU in fluid communication with the adsorption column and operable to receive at least a portion of the reject stream produced by the adsorption column, and the CPU further operable to produce high quality coke from the reject stream.

2. The system of claim 1, wherein the system further comprises a diesel hydrotreating unit (DHT), the DHT in fluid communication with a diesel inlet stream, the diesel inlet stream comprising fluid flow from the ADU middle stream, and the DHT operable to treat the diesel inlet stream with hydrogen.

3. The system of claim 2, wherein the reject stream is in fluid communication with the diesel inlet stream such that the diesel inlet stream comprises fluid flow from the reject stream in combination with the fluid flow from the ADU middle stream.

4. The system of claim 1, wherein the reject stream is in fluid communication with the ADU such that at least a portion of the reject stream may be recycled back to the ADU.

5. The system according to claim 1, wherein the aromatic bottoms stream comprises aromatic compounds with boiling points in the range of about 100° C. to about 350° C.

6. The system according to claim 1, wherein the cleaned aromatic bottoms stream is used as a gasoline blending component without any further treatment.

7. The system according to claim 1, wherein the cleaned aromatic bottoms stream is processed further to produce benzene, toluene, and xylenes.

8. The system according to claim 1, wherein the high quality coke comprises needle or graphite quality coke.

9. The system according to claim 1, wherein the system further comprises a hydrodearylation system, the hydrodearylation system intermediately positioned in fluid communication between the ARC and the adsorption column and operable to receive and process the aromatic bottoms stream for provision as a hydrodearylated effluent stream to the adsorption column.

10. The system according to claim 1, wherein the system further comprises a fluidized catalytic cracking unit, the fluidized catalytic cracking unit intermediately positioned in fluid communication between the ARC and the adsorption column and operable to receive and process the aromatic bottoms stream for provision as a catalytic cracking products stream to the adsorption column.

11. The system according to claim 1, wherein the system further comprises a hydrogenation reactor, the hydrogenation reactor intermediately positioned in fluid communication between the ARC and the adsorption column and operable to receive and process the aromatic bottoms stream for provision as a hydrogenated effluent stream to the adsorption column.

12. The system according to claim 1, wherein the system further comprises a hydrocracking reactor, the hydrocracking reactor intermediately positioned in fluid communication between the ARC and the adsorption column and operable to receive and process the aromatic bottoms stream for provision as a hydrocracked effluent stream to the adsorption column.

13. The system according to claim 1, wherein the ARC comprises a transalkylation unit.

14. The system according to claim 1, wherein the adsorption column comprises a zeolite-based adsorbent.

15. The system according to claim 14, wherein the zeolite-based adsorbent is selected from FAU, BEA, MOR, and MFI framework zeolites.

16. The system according to claim 1, wherein the adsorption column comprises an activated carbon based adsorbent.

* * * * *